United States Patent [19]
Cary et al.

[11] 3,825,107
[45] July 23, 1974

[54] EXTENDIBLE CONVEYOR SYSTEM

[76] Inventors: John M. Cary, 2958 Maryann Ln., Pittsburgh, Calif. 94565; Michael F. Mahacek, 9092 Cherry Ave., Orangevale, Calif. 95662

[22] Filed: July 26, 1971

[21] Appl. No.: 166,186

[52] U.S. Cl................ 198/139, 212/55, 214/83.26
[51] Int. Cl............................................ B65g 15/26
[58] Field of Search......... 198/139; 212/55; 52/121; 214/83.1, 83.26

[56] References Cited
UNITED STATES PATENTS

| | | | |
|---|---|---|---|
| 2,166,447 | 7/1939 | Ruppenthal | 198/139 |
| 2,815,849 | 12/1957 | Zumbrunnen | 198/139 |
| 2,927,705 | 3/1960 | Girardi | 214/83.1 |
| 3,109,545 | 11/1963 | Hedin | 212/55 X |
| 3,403,485 | 10/1968 | Cernosek | 52/121 |
| 3,587,886 | 6/1971 | Gano et al. | 212/55 R |

FOREIGN PATENTS OR APPLICATIONS

| 59,474 | 9/1923 | Sweden | 198/139 |
|---|---|---|---|

*Primary Examiner*—Richard E. Aegerter
*Assistant Examiner*—Richard K. Thomson
*Attorney, Agent, or Firm*—Joseph B. Gardner, Esq.

[57] ABSTRACT

An extendible and retractable conveyor includes a telescoping arrangement of conveyor sections or beam members which may be mounted on a truck or other vehicle. A first or outer beam member is pivoted and inclined upwardly on a rotatable base member. A second or intermediate beam member is movable longitudinally along and with respect to the first beam member, and a third or inner beam member is further longitudinally movable along and relative to the second beam member. A continuous conveyor belt has a first reach and a second reach spanning the combined lengths of the beam members and extending and retracting therewith. Two pulleys, supporting four additional reaches of the belt, are mounted to move longitudinally of the first beam member to retract and extend in complement to the extending and retracting of the second and third beam members. Friction gears or the like are mounted on the second beam member to provide a differential drive means for extending and retracting the third beam member and the first two reaches of the conveyor belt at twice the rate of complementary retracting and extending of the pulleys supporting the four additional belt reaches.

7 Claims, 10 Drawing Figures

INVENTORS:
JOHN M. CARY
MICHAEL F. MAHACEK
BY: Joseph B. Gardner
ATTORNEY

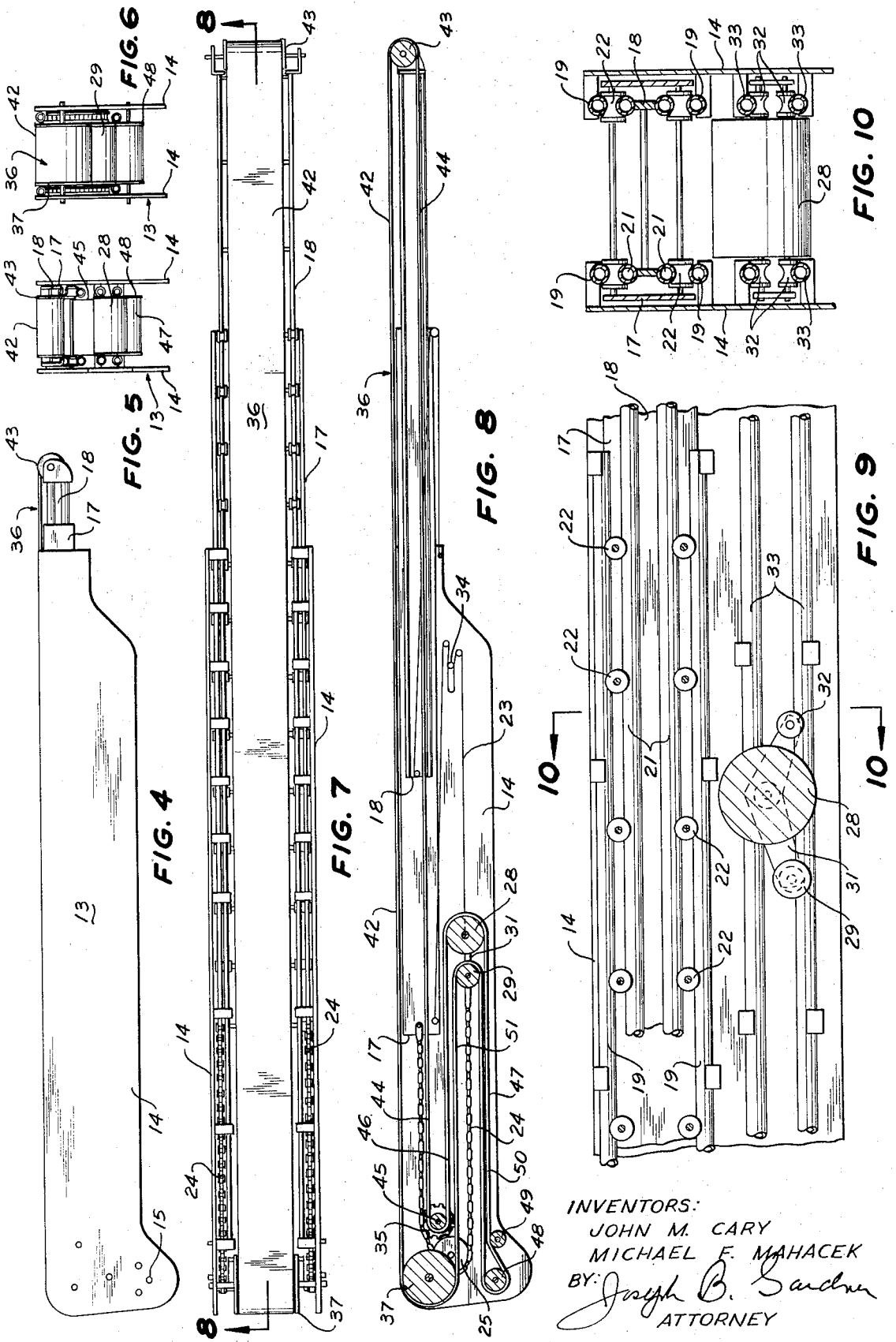

EXTENDIBLE CONVEYOR SYSTEM

BACKGROUND OF THE INVENTION

The present invention relates to conveyors for moving loads from one location to another; and more particularly this invention relates to a conveyor mechanism which can be mounted on a vehicle such as a truck and can be inclined vertically and extended longitudinally to transport the load to places where access is difficult, such as the roofs of houses or other buildings.

A belt conveyor conventionally includes a continuous or endless belt reaching between or spanning the space between supporting pulleys. A conveyor of this type may include two spaced apart pulleys and the endless belt is entrained thereabout and is therefore provided with an upper reach and with a lower reach. With such an arrangement the space between the pulleys which determines the available conveyor length or reach of the belt must be held substantially constant since the belt will remain constant in length and a usual belt tightening means can only take up a minimal amount of slack from the belt.

It is an object of this invention to provide an improved conveyor system; and, more particularly, it is an object to provide a belt conveyor with multiple spans or reaches such that a pair of reaches may be extended while other compensating reaches may be retracted, and vice versa, to maintain a substantially constant overall belt length of the system.

A further object is to provide telescoping beam members for supporting a conveyor belt; and more specifically it is an object to provide a first supporting beam with both a second and a third beam longitudinally extendible therefrom such that the third beam will be moved by differential drive means at twice the rate of the second beam.

It is another object to provide an improved conveyor system wherein a first reach or span of a belt will extend and retract at a faster rate than other complementary reaches retract and expand and wherein a plurality of complementary reaches will compensate for the faster rate of extension and retraction of the first reach.

It is a further object to provide an improved conveyor system which may be mounted on a vehicle such as a fork lift, a truck or railroad car, wherein means are provided for rotating the conveyor to a desired direction with respect to the vehicle, for inclining the conveyor at a desired angle, and for extending or retracting the conveyor as desired; and more particularly, it is an object to provide such a conveyor system that can be adjusted while in use and transporting loads to or from the vehicle.

SUMMARY OF THE INVENTION

According to this invention, an extendible and retractable conveyor mechanism includes three beam members or conveyor sections each comprising a pair of transversely spaced, generally parallel side plates. The second beam member is disposed between the side plates of the first beam member, and third beam member is located between the side plates of the second beam member. A series of longitudinally spaced friction gears are rotatably mounted on the second beam member and are drivingly engaged by the first beam member and drivingly engage the third member. The friction gears provide roller bearings for supporting the second and the third beam members and for allowing longitudinal translation thereof relative to each other and to the first beam member. The friction gears further provide a differential drive means such that longitudinal translation imparted to the second beam member is transmitted to the third beam member at about twice the rate.

A pair of pulleys comprising a part of the mechanism are moved in an opposite or complementary direction to that of the second beam member. A continuous or endless coveyor belt also forming a part of the conveyor mechanism has two reaches extending to the extreme end of the second beam member and has four further take up and supply reaches extending to the two pulleys of complementary movement, whereby extension or retraction of the first two reaches will be compensated for or accommodated by the four reaches associated with the two pulleys having complementary retraction and extension.

DESCRIPTION OF THE DRAWINGS

The various features and advantages of the present invention will become apparent upon a consideration of the following description taken in connection with the accompanying drawings showing an exemplary embodiment of this invention. The views of the drawings are as follows:

FIG. 4 is a side or elevation view of the conveyor of this invention as it is fully retracted;

FIG. 5 is an end view of the conveyor looking toward the forward end thereof;

FIG. 6 is an end view of the conveyor looking toward the rear end thereof.

FIG. 7 is a top or plan view of the conveyor as fully extended;

FIG. 8 is a sectional view looking along the plane 88 of FIG. 7;

FIG. 9 is an enlarged fragmentary detail of FIG. 7; and

FIG. 10 is a section along the plane 10—10 of FIG. 9.

DESCRIPTION OF THE PREFERRED EMBODIMENT

Figure 1:
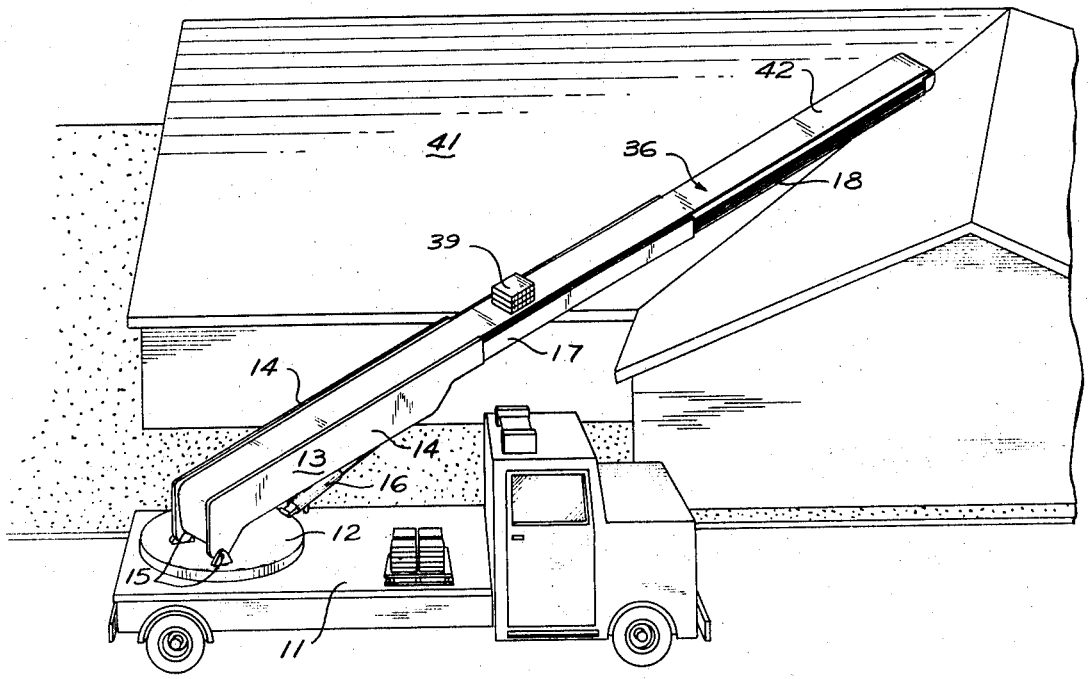
FIG. 1 is a perspective view illustrating the manner of mounting the conveyor system of this invention on a vehicle such as a truck to transport loads to a comparatively inaccessible location such as the roof of a house.
Figure 2:
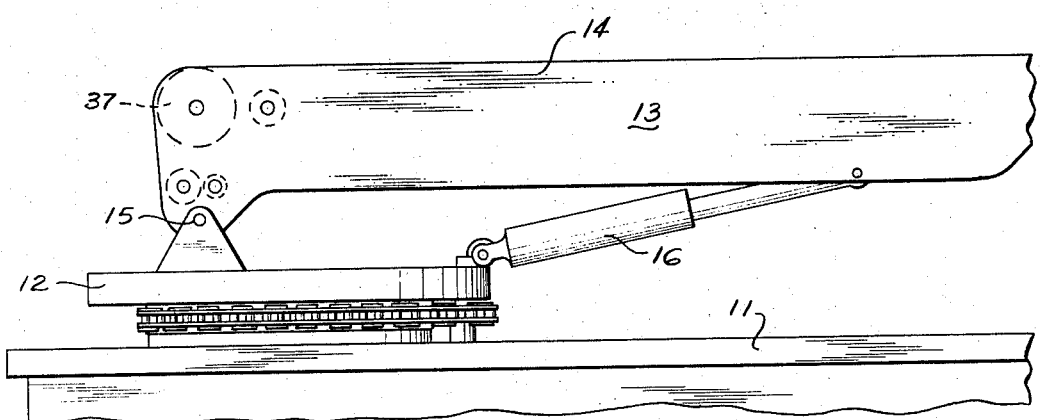
FIG. 2 is a side or elevation view of a fragment of the truck bed and a portion of the conveyor illustrating the rotatable mounting of the conveyor and the pivotal arrangement for inclining the conveyor at an angle.
Figure 3:
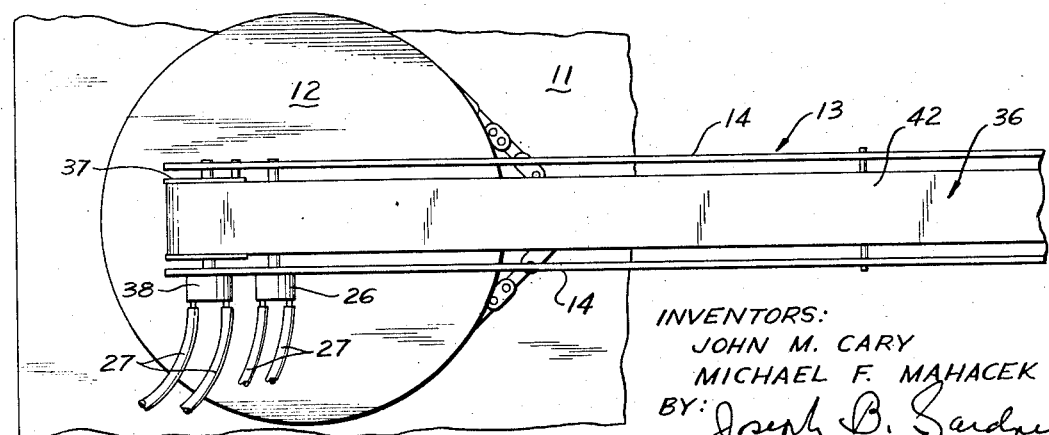
FIG. 3 is a top or plan view of the fragment of the truck bed and the portion of the conveyor shown by FIG. 2.

As shown in FIGS. 1, 2, and 3 the conveyor system of this invention may be mounted on the bed of a vehicle such as a truck 11. A rotatable base member 12 is positioned on the truck bed 11, and a first or outer beam member 13 comprising two spaced apart elongated side plates 14 disposed in parallel relation is mounted upon the base member. The first beam member 13 is supported by pivots 15, and it may be inclined at any desired angle by a drive means such as a hydraulic motor 16 including a cylinder and piston coupled between the base member 12 and the first beam member 13. Therefore, the first beam member 13 which supports the remainder of the conveyor system may be inclined to any desired vertical angle and may be rotated to any horizontal angle with respect to the vehicle bed 11.

A second or intermediate beam member 17 comprises a similar pair of elongated side plates positioned between the sides 14 of the first beam member 13. The beam member 17 may move longitudinally to extend and retract with respect to the first beam member 13. A third or inner beam member 18 is similarly constructed and is movably positioned within the second beam member 17. The third beam member 18 will extend and retract with respect to the second beam member, and will extend and retract relative to the first beam member 13 at a faster rate than the second beam member 17.

Each side plate 14 of the first beam member 13 carries a pair of vertically spaced rails 19 (see FIGS. 9 and 10) for supporting the second beam member 17. Each side plate of the third beam member 18 is provided with a similar pair of vertically spaced rails 21. A series of rollers or friction gears 22 are mounted upon and within the side plates of the second beam member 17 to engage both the rails 19 of the first beam member 13 and the rails 21 of the third beam member 18. It may be appreciated that the friction rollers will rotate as the second beam member 17 moves along the rails 19 of the first beam member 13; and this rotation will impart additional movement to the rails 21 of the third beam member 18. Therefore, the friction wheels or gears 22 constitute a differential drive means which will move the third beam member 18 longitudinally at twice the rate of movement of the second beam member 17.

That is to say, the inner or third beam member 18 is carried by the intermediate or second beam member 17 (by means of the rollers 22) and, without more, would be displaced longitudinally therewith at the same rate in either direction relative to the outer or first beam member 13. However, such simple relationship does not exist because the rollers 22 are forced to rotate as a consequence of their frictional engagement with the rails 19 of the first beam member 13. Therefore, the rollers 22 drive the inner beam member 18 and cause it to be displaced longitudinally relative to the intermediate beam member 17. As a result, the inner beam member 18 is displaced relative to the outer beam member 13 at twice the rate of the intermediate beam member 17.

The drive means for moving the second beam member 17 comprises a cable means including a wire or cable 23 and a chain segment 24 arranged to provide a closed or continuous loop. The chain segment 24 engages a drive sprocket 25 which may be driven by a motor 26. As shown in FIG. 3, the motor 26 may be a hydraulic motor having hydraulic pressure conduits 27 coupled thereto. One end of the chain 24 connects with the second beam member 17; and the other end thereof is coupled to a pair of belt pulleys 28 and 29, such that the pulleys 28 and 29 will move in a direction opposite or complementary to any movement of the second beam member 17.

The pulleys are supported by a carriage assembly 31 which moves on wheels or rollers 32 that may move along rails 33 supported within the side plates 14 of the first beam member 13. The cable or wire 23 is attached at one end to the second beam member 17 (see FIG. 8) and at the other end to the carriage 31 supporting the belt pulleys 28 and 29 to thereby form a closed loop with the chain segment 24. An idler arrangement 34 may be used to support the cable 23 and to take up any slack therein such that both the chain 24 and the cable 23 are properly tensioned. A further sprocket 35 is an idler engaging the chain 24 such that the chain is supported in proper alignment with the movement of the second beam member 17. The cable drive means 23–24 will permit the second beam member 17 to be extended and retracted while the belt pulleys 28 and 29 are retracted and extended to complement the movement of the second beam member 17.

A continuous or endless conveyor belt 36 is supported by and will move around a first pulley 37 at a first end of the conveyor system. The pulley 37 may be driven by a reversible hydraulic motor 38 or by other conventional means for moving the conveyor belt 36 in either direction. As shown in FIG. 1, the conveyor may be used for transporting loads 39 such as bundles of shingles into a place of difficult access such as a roof 41 of a house or other building. In this case, the conveyor belt 36 would move the load upwardly away from the first end of the first beam member 13 towards the extended end of the conveyor system; and for purposes of this disclosure, this direction of the conveyor belt 36 will be designated as the "forward direction".

The belt 36 extends forwardly in a first reach 42 to and around a second pulley 43 at the extreme end of the third beam member 18. This first reach 42 of the conveyor belt 36 provides a surface for transportng the loads 39, and will extend and retract as the beam members extend and retract. After passing over the second pulley 43, the belt returns in a second reach 44 to a third pulley 45 positioned at the first end of the first beam member 13. Therefore, the first and second reaches of the conveyor belt 36 span the combined lengths of the first and third beam members from the first end of the first beam member 13 to the extreme end of the third beam member 18.

The belt 36 passes around the third pulley 45 and extends in a third reach 46 to and around the pulley 28 which will hereafter be designated as the fourth pulley. Thence, the belt 36 extends in a fourth reach 47 to and around a fifth pulley 48. An idler pulley 49 is provided to take up slack and properly tension the conveyor belt 36. The belt passes around the fifth pulley 48 and extends in a fifth reach 50 to and around the pulley 29 which will hereafter be designated as the sixth pulley. Thence the conveyor belt 36 extends in a sixth reach 51 to and around the first pulley 37 to complete a closed path of the endless or continuous belt.

It will be appreciated that the third, fourth, fifth, and sixth reaches of the belt 36 span between the fixed pulleys 37, 45, and 48 at the first end of the first beam member 13 and the movable pulleys 28 and 29 on the carriage 31. Therefore, as the pulleys 28 and 29 are moved longitudinally by the cable drive means 23–24, four of the belt reaches will be changed in length. As indicated heretofore, the longitudinal movement of the pulleys 28 and 29 complements and compensates for the longitudinal movement of the second beam member 17 and the third beam member 18. The third beam member, carrying the belt pulley 43, extends and retracts at twice the rate of the complementary retraction and extension of the pulleys 28 and 29. Therefore, any longitudinal movement of the third beam member 18 will change the length of the first and second reaches 42 and 44 by double the amount of complementary changes in the length of the other four reaches 46, 47, 50, and 51, such that the total length of all six reaches will remain constant. The longitudinal movements of the pulleys 28 and 29 will complement and compensate for the longitudinal movements of the third beam member 18.

An important feature of the conveyor system of this invention resides in the ability to swing the conveyor through angles, to raise or lower the forward end thereof, or to extend or retract that end while the conveyor is actually carrying loads. As shown in FIG. 1, the conveyor may be used in raising materials to a roof. If the roof were being tiled, rather heavy ceramic tiles could be transported to workers who would move around on the roof as the job progresses. The tiles could be transported, one at a time, to the location of a worker, who could take each tile from the conveyor for immediate use. As the worker moves around and as the job progresses, the conveyor end may move and follow the worker — continually moving and delivering each tile or other part to the precise locations where it is needed.

What is claimed is:

1. An extendible and retractable conveyor system comprising: a first elongated beam member equpped with a plurality of longitudinally extending rails; a second elongated beam member reciprocably movable longitudinally along said first beam member; a third elongated beam member reciprocably movable along said second beam member and having a plurality of longitudinally extending rails; a plurality of rollers mounted on said second elongated beam member and engaging the plurality of rails of said first beam member for movably supporting said second beam member thereby, and said plurality of rollers also engaging the plurality of rails of said third beam member for movably supporting the same thereby, whereby movement of said second beam member with respect to said first beam member causes said plurality of rollers to rotate and thereby impart a similar movement to said third beam member with respect to said second beam member; a continuous belt having a first reach and a second reach extending along a combined length of said beam members and being extendible and retractable with the movable beam members; a longitudinally movable belt-supporting pulley for movement complementary to said movable beam members so that said belt is held taut in all positions of said movable beam members; a first pulley rotatably mounted at a first end of said first beam member; a second pulley rotatably mounted at an extreme end of said third beam member; said first reach of said continuous belt extending between said first and second pulleys to provide an extendible and retractable conveyor surface for supporting and transporting loads; a third pulley rotatably mounted at the first end of said first beam member; said longitudinally movable belt-supporting pulley constituting a fourth pulley; a fifth pulley rotatably mounted at the first end of said first beam member; and a sixth pulley positioned adjacent said fourth pulley and mounted to move longitudinally of said first member in unison with said fourth pulley; said continuous belt extending from said first pulley in the first reach to and around said second pulley, thence in the second reach to and around said third pulley, thence in a third reach to and around said fourth pulley, thence in a fourth reach to and around said fifth pulley, thence in a fifth reach to and around said sixth pulley, and thence in a sixth reach to and around said first pulley to complete a closed path.

2. An extendible and retractable conveyor system in accordance with claim 1 further comprising: a drive means coupled to said second beam member and to said fourth and sixth pulleys for controllably extending and retracting said second beam member and for complementary retracting and extending said fourth and sixth pulleys; said differential drive means extending and retracting said third beam member at twice the rate of said complementary retracting and extending of said fourth and sixth pulleys whereby extensions and retractions of the first and second reaches of the belt will be compensated by retractions and extensions of the third, fourth, fifth and sixth reaches of the belt.

3. The extendible and retractable conveyor system in accordance with claim 2 wherein said drive means comprises a cable means extending around a closed path and connecting with said second beam member and said fourth and sixth pulleys.

4. An extendible and retractable conveyor system in accordance with claim 3 wherein said cable means comprises a segment of chain and further comprising a drive sprocket engaging said chain.

5. An extendible and retractable conveyor system in accordance with claim 4 further comprising: a base member mounted to rotate about a vertical axis; said first beam member being pivotally mounted on said base member at the first end thereof; and said drive means coupled to said first beam member for controllably pivoting said conveyor system to a desired angle of inclination.

6. An extendible and retractable conveyor system for a vehicle in accordance with claim 5 wherein said base member is rotatably mounted on said vehicle, and wherein said drive means comprises a hydraulic cylinder coupled between said base member and said first beam member.

7. An extendible and retractable conveyor system comprising: a first elongated beam member equipped with a plurality of longitudinally extending rails; a second elongated beam member reciprocably movable longitudinally along said first beam member; a third elongated beam member reciprocably movable along said second beam member and having a plurality of longitudinally extending rails; a plurality of rollers mounted on said second elongated beam member and engaging the plurality of rails of said first beam member for movably supporting said second beam member thereby, and said plurality of rollers also engaging the plurality of rails of said third beam member for movably supporting the same thereby, whereby movement of said second beam member with respect to said first beam member causes said plurality of rollers to rotate and thereby impart a similar movement to said third beam member with respect to said second beam member; a continuous belt having a first reach and a second reach extending along a combined length of said beam members and being extendible and retractable with the movable beam members; a longitudinally movable belt-supporting pulley for moving complementary to said movable beam members so that said belt is held taut in all positions of said movable beam members; a first pulley rotatably mounted at a first end of said first beam member; and a second pulley rotatably mounted at an extreme end of said third beam member; said first reach of said continuous belt extending between said first and second pulleys to provide an extendible and retractable conveyor surface for supporting and transporting loads; each of said beam members including a pair of spaced apart elongated plates extending parallel to each other; said plurality of rails of said first beam member being a pair of parallel spaced apart rails adjacent the inner sides of each elongated plate of said first beam member; said plurality of rails of said third beam member being a pair of parallel spaced apart rails extending adjacent the longitudinal edges of each elongated plate of said third beam member; and said plurality of rollers being a pair of parallel spaced apart rows of rollers adjacent each elongated plate of said second beam member, the rails of said first beam member engaging said rollers on the outside of said rows and the rails of said third beam member engaging said rollers on the inside of said rows.

* * * * *